A. CAMPBELL.
SPRING FRICTION GEAR.
APPLICATION FILED APR. 13, 1916.

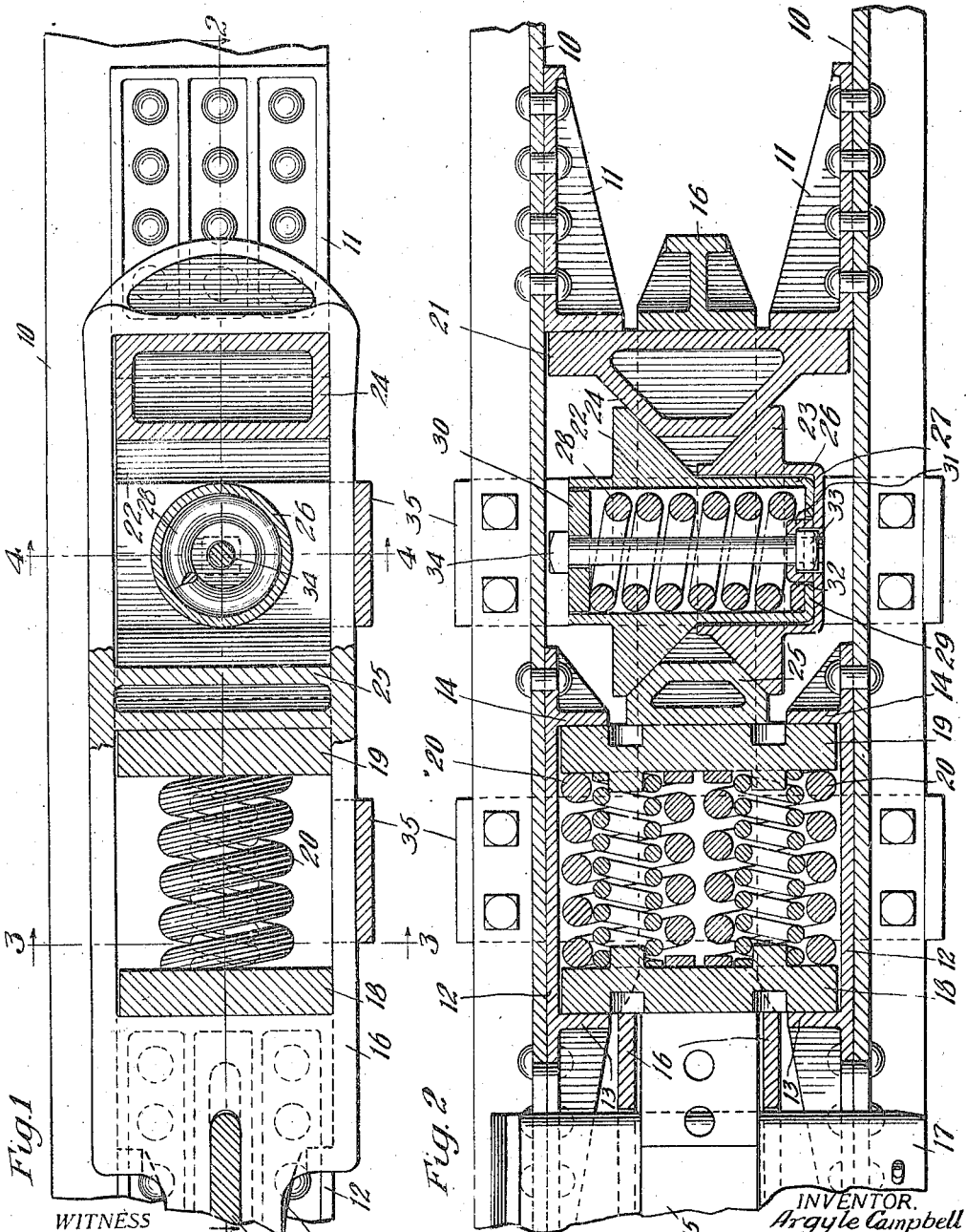

1,255,132.

Patented Feb. 5, 1918.
2 SHEETS—SHEET 2.

WITNESS
Wm. Geiger

INVENTOR.
Argyle Campbell
BY
ATTORNEY

UNITED STATES PATENT OFFICE.

ARGYLE CAMPBELL, OF CHICAGO, ILLINOIS, ASSIGNOR TO WILLIAM H. MINER, OF CHAZY, NEW YORK.

SPRING FRICTION-GEAR.

1,255,132. Specification of Letters Patent. Patented Feb. 5, 1918.

Application filed April 13, 1916. Serial No. 90,835.

*To all whom it may concern:*

Be it known that I, ARGYLE CAMPBELL, a citizen of the United States, residing at Chicago, in the county of Cook and State of Illinois, have invented a certain new and useful Improvement in Spring Friction-Gears, of which the following is a full, clear, concise, and exact description, reference being had to the accompanying drawings, forming a part of this specification.

This invention relates to improvements in spring friction gear.

The object of the invention is to provide a gear for railway cars having high capacity and arranged to give an easy graduated action, and so designed that both springs and friction mechanism are employed in buff, and only springs in draft.

Another object of the invention is to so combine the friction and spring elements of the gear that the friction mechanism will act as a dampener during the release operation, and thereby prevent excessive and injurious recoil.

The invention furthermore consists in improvements in the parts and devices and in the novel combinations of the parts and devices herein shown, described and claimed.

Figure 3:
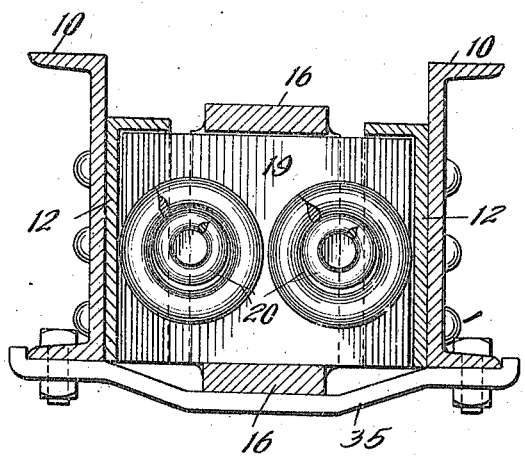
Figure 4:
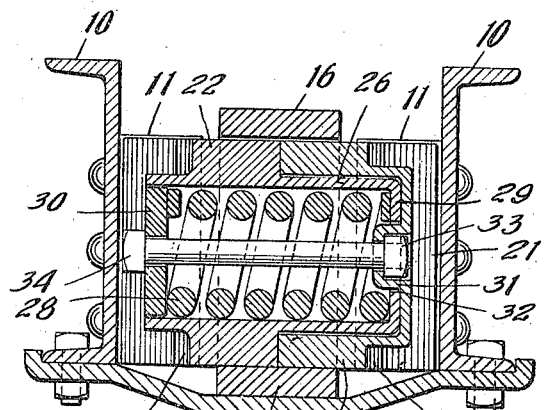
Figure 5:
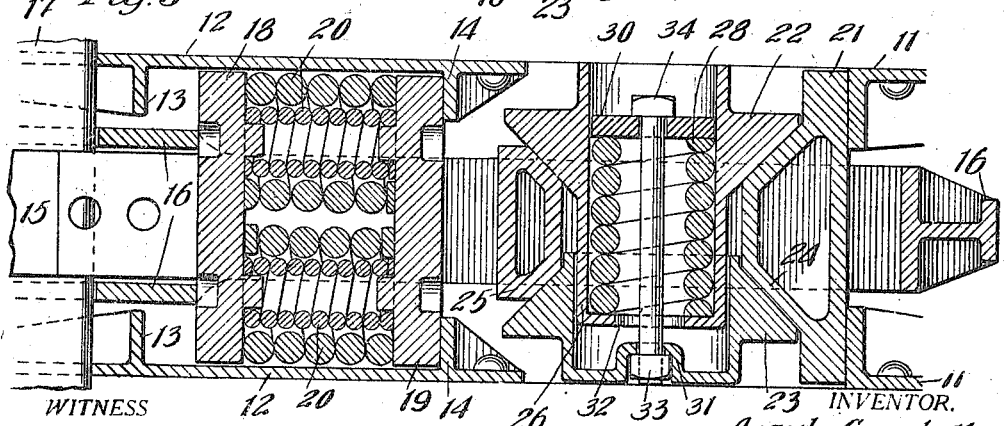

In the drawing forming a part of this specification, Figure 1, is a longitudinal sectional view of a railway car draft rigging showing my improvements in connection therewith, parts of the yoke being broken away to more clearly illustrate the construction. Fig. 2 is a horizontal sectional view of the draft gear illustrated in Fig. 1, and taken substantially on the line 2—2 thereof, the parts being shown in full release. Figs. 3 and 4 are transverse, vertical sectional views taken on the lines 3—3 and 4—4 respectively of Fig. 1; and Fig. 5 is a sectional view similar to Fig. 2, but illustrating the parts under full compression.

Referring to said drawing, 10—10, denote the center or draft sills to which are secured rear stops 11—11, and stop castings 12—12, the latter being each provided with a front shoulder or stop 13 and intermediate shoulder or stop 14. The draw-bar 15 is operatively connected to the gear by means of a cast yoke 16, the latter having a hooked forward end by which it is keyed to the draw-bar as by the coupler key 17.

As shown in the drawing, the gear comprises a spring unit and a friction unit, the former including a front follower 18 and a rear follower 19, with horizontal twin arranged springs 20—20 therebetween, each of said springs 20 preferably comprising an outer heavy coil and an inner nested light coil. The friction unit, as shown, comprises a rear follower 21, oppositely arranged, transversely movable friction shoes 22 and 23, wedge 24 formed integrally with the rear follower 21, and wedge 25 formed integrally with the vertical thimble of the yoke. The friction shoe 22 is provided with a hollow extension 26 circular in cross-section, which extension is seated in a corresponding recess 27 formed in the friction shoe 23. Mounted within the recess provided within the friction shoe 22 is a transversely arranged spring 28, which is seated at one end against the end 29 of said extension 26, and at its other end against a follower 30. The friction shoe 23 is provided with an inwardly extending hollow boss 31, which normally passes through a perforation 32 in the end wall 29, said hollow boss being adapted to receive a nut 33 on the end of a retaining bolt 34 which passes through the spring and through the follower 30. The parts are supported in operative position by means of a pair of detachably secured tie-plates 35—35.

The operation is as follows: Upon buffing or inward movement of the draw-bar, it is apparent that the followers 19 and 21 will remain stationary. The front follower 18 is moved rearwardly, thereby compressing the springs 20—20. Simultaneously the tandem yoke is moved rearwardly, so that the wedge thimble thereof will travel toward the wedge 24 on the rear follower 21. During the relative approach of the wedges 24 and 25, it is apparent that the friction shoes 22 and 23 will be forced apart laterally and the spring 28 simultaneously compressed, the compression movement of the spring being double the movement of either of the shoes 22 or 23, since each end of the spring is moved toward the center of the gear, as clearly appears from a comparison of Figs. 2 and 5. Upon release, the springs 20—20 will tend to expand in the usual manner, but, owing to the friction unit, this excessive recoil will be eliminated, the friction elements acting as dampeners. From the foregoing it will be seen that in buff I obtain the cumulative resistance of the spring unit and friction united acting simultaneously.

In draft, it is apparent that the front follower 18 will remain stationary, and, as the yoke moves forwardly the thimble thereof will move the follower 19 forwardly, thus compressing the springs 20—20. During the draft action there will be no relative movement between the wedges 24 and 25, so that the friction unit will not be actuated but will travel in unison with the yoke.

From the preceding description it will be seen that I have provided a gear of high combined spring and friction capacity under buff, when the heaviest shocks are encountered, and a straight spring gear under draft, the spring gear being also of comparatively heavy capacity and equivalent to the tandem spring gears commonly used. It will also be noted that the entire arrangement is compact and comparatively cheap to manufacture.

Although I have herein shown and described what I now consider the preferred embodiment of my invention, the same is merely illustrative, and I contemplate all changes and modifications that come within the scope of the claims appended hereto.

I claim:

1. In a draft rigging for railway cars, the combination with draft sills, rear stops and front stops, and intermediate stops arranged to prevent rearward movement of an intermediate follower, front and rear end followers, and an intermediate follower, of a spring gear unit between one of said end followers and the intermediate follower, and a friction gear unit between said intermediate follower and the other end follower, two of said followers being movable in draft and only one in buff.

2. In mechanism of the character described, the combination with a spring gear unit and a friction gear unit, of a yoke coöperable with said units, said yoke having a thimble provided with a wedge for actuating the friction gear unit in buff.

3. In a draft rigging, the combination with a spring gear and a friction gear, of a tandem yoke having an intermediate thimble provided with an integral wedge, coöperable with the friction gear unit.

4. In a draft rigging, the combination with three followers, of springs interposed between the front and central followers, spring controlled, transversely movable friction shoes located between the central follower and the rear follower, and a yoke, said yoke having a wedge coöperable with the friction unit.

5. In a draft rigging for railway cars, the combination with rear stops, front stops, and intermediate stops, of a front follower, rear follower, intermediate follower, springs between the front and intermediate followers, a wedge movable with said rear follower, a yoke, a wedge movable with said yoke, and transversely movable friction shoes coöperable with said wedges.

6. As an article of manufacture, a yoke having an intermediate thimble provided with a wedge.

7. In a draft rigging for cars, the combination with a front follower, an intermediate follower, and springs arranged between said front and intermediate followers, of a wedge member movable in unison with the front follower and located at the rear of said intermediate follower, laterally movable, interengaging spring containers arranged to be operated transversely of the car by said wedge member, a spring within said containers, and a rear follower by which rearward movement of said spring containers is governed.

8. In a draft rigging for railway cars, the combination with three followers, and three sets of stop members, two of said sets preventing rearward movement of two followers and the other set preventing forward movement of the third follower, of longitudinally arranged front springs adapted to be compressed in either buff or draft, transversely arranged spring housings at the rear of said springs, a spring within said housings, said spring housings being operated to move transversely of the car to compress the springs therewithin upon buff, said transversely arranged housings and spring acting as a dampener to reduce recoil, said transverse housings and spring being movable longitudinally of the car as a unit without being actuated, under draft.

In witness that I claim the foregoing I have hereunto subscribed my name this 23rd day of March, 1916.

ARGYLE CAMPBELL.